United States Patent [19]
Culver

[11] 3,724,082
[45] Apr. 3, 1973

[54] FLEXURE MOUNTING FOR FRICTION-WHEEL MEASUREMENT DEVICE

[75] Inventor: Irven H. Culver, Playa del Rey, Calif.

[73] Assignee: Primus Mfg. Inc., San Lorenzo, Puerto Rico

[22] Filed: Aug. 27, 1970

[21] Appl. No.: 67,379

Related U.S. Application Data

[63] Continuation-in-part of Ser. No. 9,872, Feb. 9, 1070, abandoned.

[52] U.S. Cl. ............................ 33/141 E, 33/125 M
[51] Int. Cl. ..................................... G01b 3/12
[58] Field of Search ............ 33/141 R, 141 E, 125 M

[56] References Cited

UNITED STATES PATENTS

| | | | |
|---|---|---|---|
| 2,011,931 | 8/1935 | Dreyer | 33/174 L |
| 3,311,985 | 4/1967 | Hodge | 33/141 A |

FOREIGN PATENTS OR APPLICATIONS

| | | | |
|---|---|---|---|
| 509,406 | 1/1955 | Italy | 33/125 |

*Primary Examiner*—Harry N. Haroian
*Attorney*—Christie, Parker & Hale

[57] ABSTRACT

A mounting and biasing mechanism for maintaining an essentially constant tracking force between a frictionally driven distance measuring metering wheel and a measurement surface, along which the wheel rolls in use, is described. An end-loaded leaf spring of desired stiffness provides the desired tracking force, and is preloaded and predeflected as a slender column so that the wheel follows undulations of the measurement surface with essentially no change in the force applied by the spring to the wheel.

19 Claims, 10 Drawing Figures

PATENTED APR 3 1973

INVENTOR.
IRVEN H. CULVER
BY
Christie, Parker, & Hale
ATTORNEYS

FLEXURE MOUNTING FOR FRICTION-WHEEL MEASUREMENT DEVICE

CROSS-REFERENCE TO RELATED APPLICATIONS

This application is a continuation-in-part of copending application Ser. No. 9,872 filed Feb. 9, 1970, now abandoned.

BACKGROUND OF THE INVENTION

1. Field of the Invention

This invention pertains to precision distance measuring by use of friction-wheel measuring devices. More specifically, the invention pertains to apparatus for mounting the measuring device for engagement of the wheel with a measurement surface with essentially constant tracking force.

2. Description of the Prior Art

A widely used friction-wheel measuring device is described in U.S. Pat. No. 3,378,929. A common use of friction wheel measuring devices is in combination with machine tools where the devices are used to measure the distance one part of a machine tool is moved relative to another part of the tool. For example, a friction-wheel measuring device is often mounted to a lathe carriage to engage a guideway surface of the lathe bed to measure the distance the carriage is moved along the lathe bed. Such devices, however, are not restricted to use on lathes, and have, in fact, found many other uses including in coordinate measuring machines, as well as on any machine tool.

The friction-wheel measuring device shown in U.S. Pat. No. 3,378,929 is marketed in the United States in conjunction with the trademark "Trav-A-Dial." The device features internal motion amplification of the rotation of the frictionally driven metering wheel so that the distance of travel monitored by the wheel is precisely presented on dials graduated in inches, and tenths, hundredths and thousandths of an inch, as shown in the patent, or on a remote digital display device having a measurement display capacity corresponding to many rotations of the metering wheel.

It was with the advent of measuring systems having the extended readout capability noted above that a problem was first identified. The problem is one of repeatability errors produced by the environment of the measuring device rather than by the device itself. A repeatability error is a failure of the device to read "0" when returned to a "0 position" after several cycles of motion away from and back to the "0 position," each cycle preferably involving plural rotations of the metering wheel. Lack of repeatability can be quite troublesome where the measuring device is used in the machining of a complex part on a large machine tool, which machining process may require several days' work by a skilled machinist. As used in this application "repeatability"d is to be distinguished from "accuracy," the latter being defined as the ability of the device, over short distances of travel in one direction, to indicate the exact amount traveled, whereas repeatability is as defined above.

The first generation "Trav-A-Dial" measuring devices (see U.S. Pat. No. 3,378,929) have metering wheels having a circumference of, say, 6 inches and are warranted to be accurate to within 0.001 inch per 6 inches of travel. The digital readout devices (second generation) also use a 6-inch metering wheel, but can be operated over distances of up to 100 inches or more before recylcing of the readout mechanism occurs. Basically, the first and second generation devices are essentially identical mechanically except as to the readout mechanisms thereof. It would seem, therefore, that the accuracy and repeatability of the second generation device per inch of travel should be the same as that of the first generation device; in practical fact, such is the case.

The first generation devices, as a practical matter, were operated over short distances of travel under conditions in which repeatability errors were not discerned. It was discovered that unexplained repeatability errors were encountered as a result of the use of digital readout devices over extended distances of travel for which such devices were suited. More specifically, it was found that in the second generation systems, the measuring device had rated accuracy per inch of travel and presented no repeatability problems when operated over short distances, but that the same device used in exactly the same mounting on the same machine tool showed repeatability error, but not a change in accuracy, when operated a number of times over greater distances of travel of the metering wheel; the first generation devices were found to manifest the same type of repeatability errors when operated cyclically over extended distances of travel. It was also found that the magnitude of the repeatability error varied, for the same device, from machine tool to machine tool, even where the machine tools were of the same model number and originated from a common source. These findings indicated that the repeatability error was associated with the individual machine tools, not with the friction-wheel measuring devices, but such findings did not identify the true cause of such errors.

The repeatability errors described above were discovered to be produced by non-reciprocal deflections of both the components of the machine tool itself, which components were formerly thought to be absolutely rigid, and of the supporting bracketry mounting the measuring device on the machine tool. Such deflections are admittedly very slight, but they are sufficient in magnitude to produce repeatability errors in a friction-wheel measuring device operated cyclically over long distances of travel.

A method was evolved for mounting the device to compensate, in large part, for repeatability errors generated by these non-reciprocal deflections. The method involved determining the magnitude of repeatability error generated when the device is mounted with its plane of rotation parallel to the line of gross relative movement of the measuring device along the measurement surface with which the metering wheel is engaged, and then adjusting the device so that the rotational axis of the metering wheel is displaced from perpendicularity (i.e., so that the plane of wheel rotation is displaced from parallelism) to the line of gross relative movement by an amount which compensates for the repeatability error. In other words, the device was intentionally mounted so that, in an at-rest state, the metering wheel appeared to track skew to the direction of wheel travel, the angle of skew being of an amount which inherently compensated for a substantial portion of the repeatability errors otherwise encountered. The term "gross relative movement" is used in the present description to designate the principal intended mode of movement relied upon to operate the measuring device.

Repeatability errors are produced by one or more of three causative factors: (1) tracking of the metering wheel skew to the direction of gross relative movement between a lathe bed and lathe carriage, for example; (2) variations in the pitch of the metering wheel relative to the measurement surface; and (3) variations in the force of engagement of the metering wheel with the measurement surface. (Variations in the pitch of the metering wheel are significant because it is preferred that the peripheral surface of the wheel be defined as a portion of a sphere, rather than as a portion of a right circular cylinder, for the reasons described in U.S. Pat. No. 3,307,265.) The above-described method inherently eliminated essentially all repeatability errors caused by factors 1 and 2 above; factor 3, however, still remained a problem because of the effects of metal elastic crowding to which U.S. Pat. No. 3,307,265 is addressed.

The mounting mechanism heretofore used with friction-wheel distance measuring devices are typified by the mounting mechanism described in U.S. Pat. No. 3,378,929. The prior mounting mechanisms are characterized by the use of stiff springs which are biased to provide the desired wheel tracking and engagement force. In any spring, the force developed by the spring is equal to the effective stiffness of the spring times the amount of deflection of the spring. If the spring has high stiffness, a small deflection of the spring corresponds to a large force developed by the spring.

Furthermore, the prior mounting mechanisms are characterized by an essentially linear spring stiffness including, however, a high degree of frictional hysteresis caused by the frictional slidability of the measurement device relative to the mounting mechanism (see U.S. Pat. No. 3,378,929 and FIG. 6 of this application).

Variations in the force of engagement of the metering wheel with the measurement surface (factor 3 described above) may arise in one or both of two ways. First, force variations may be caused by deflections in the machine tool which act to move the metering wheel toward or away from the measurement surface. Second, the measurement surface may be slightly undulatory rather than flat. In either case, the effect is to move the measuring device against the bias of the spring contained in the prior mounting mechanisms, thereby altering the state of deflection of the spring and changing the force of engagement of the wheel with the measurement surface.

SUMMARY OF THE INVENTION

This invention provides a biasing and mounting mechanism for friction-wheel measuring devices of the general character described above in which the desired wheel tracking and engagement force is provided by a spring arrangement having an effective spring rate of essentially zero magnitude as manifested at the metering wheel and absent any variations therein due to frictional hysteresis. Spring rate is the first derivative ($dF/dS$) of the force-to-deflection curve for a given spring, F being the force developed by the spring for any deflection S. The mechanism is rugged, mechanically simple, easily adjusted, and both economic and efficient.

Generally speaking, this invention provides a mounting mechanism for a friction-wheel measuring device and includes first and second relatively movable members. Means mount the second member to the first member for relative movement therebetween along only a single substantially linear path. Means are further provided for coupling a friction-wheel measuring device to the first member such that the friction wheel of the device rotates in a plane essentially parallel with the path. The second member is secured to a structure with which the measuring device is to be used. Additionally, means resiliently bias the first member in a selected direction along the path relative to the second member with a selected force which, when effective at the friction wheel of a measuring device coupled to the first member, is essentially constant throughout substantial movement of the first member relative to the second member.

DESCRIPTION OF THE DRAWINGS

The above-mentioned and other features of the invention are more fully set forth in the following detailed explanation and description of presently preferred structural embodiments of the invention, which explanation and description is presented with reference to the accompanying drawings, wherein.

DESCRIPTION OF THE ILLUSTRATED EMBODIMENTS

Figure 1:
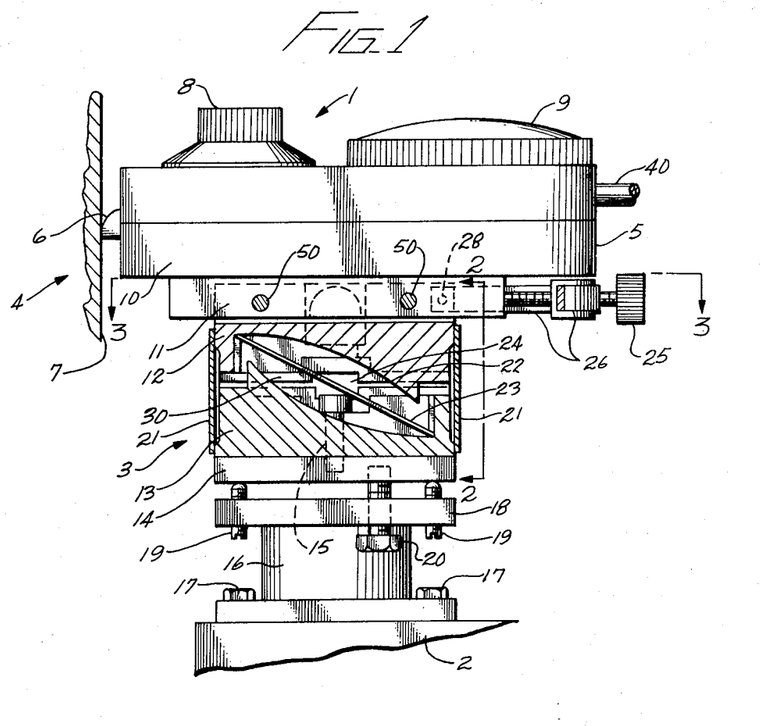
FIG. 1 is a side view of a friction-wheel measuring device mounted on a machine tool by mounting apparatus according to the present invention.

FIG. 1 illustrates the mounting of a friction-wheel distance measuring device 1 to a lathe carriage 2, for example, by a mounting assembly 3 for measurement of the distance which the lathe carriage moves relative to a lathe bed 4. The measuring device includes a housing 5 within which is rotatably mounted a circular metering wheel 6 of carefully predetermined and known circumferential extent. The metering wheel is mounted in the housing so that, in use of the device, the rim of the wheel frictionally contacts a measurement surface 7 defined by the lathe bed and along which measurements are to be made of the amount of travel of the lathe carriage relative to the bed.

A gross measurement indicator dial 8, calibrated in any desired measurement scale (e.g., inches), is disposed on the upper surface of the housing and is coupled directly to the shaft (not shown, but see U.S. Pat. No. 3,378,929) which supports the metering wheel. A fine measurement indicator 9 for indicating small increments of measured travel is also mounted to the upper surface of the housing. Indicator 9 includes a dial plate (not shown) calibrated, for example, in hundredths and thousandths of an inch and a rotatable pointer (not shown) which cooperates with the dial plate and which is coupled to the metering wheel via an anti-backlashed motion amplifying gear train (not shown); see U.S. Pat. No. 3,378,929. Any angular movement of the metering wheel is immediately manifested by indicators 8 and 9, which, in combination, serve to indicate the distance which the metering wheel has traveled along the measurement surface. If, as shown, the measuring device is a part of a remote reading, extended travel friction-wheel distance measuring system, housing 5 also includes a mechanism driven by wheel 6 for generating electrical signals indicative of discrete increments of wheel rotation, which signals are supplied from the housing to a remote digital display device, for example, over conductor cable 40.

Figure 2:
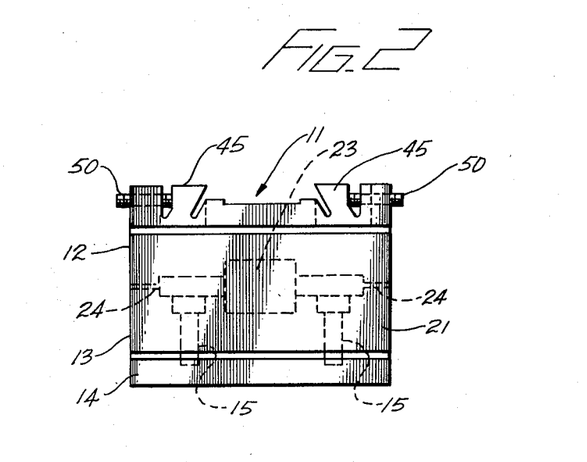
FIG. 2 is a view taken along line 2—2 in FIG. 1.

A male dovetail member 10 is secured to the underside of housing 5 and has its length aligned parallel to the elongate extent of housing 5, which extent is also preferably disposed perpendicular to measurement surface 7 during use of the measuring device. The male dovetail member is slidably positioned in a female dovetail groove 11 (see FIG. 2) provided in the upper surface of a first mounting block 12 (also referred to as a first relatively movable member or part) which comprises the upper component of mounting assembly 3. A second mounting block 13 (also referred to as a second relatively movable member or part) has its lower surface mounted to plate 14 by means of bolts 15 (only one being shown). The lower end of a mounting pedestal 16 is securely fastened to lathe carriage 2 by means of bolts 17. The upper end of the pedestal terminates in a peripheral flange 18. A pair of set screws 19 are threaded through flange 18 along a line perpendicular to measurement surface 7 to abut but not penetrate the lower surface of plate 14. Flange 18 is coupled to plate 14 by a pair of bolts 20 (only one being shown) located along a line parallel to the measurement surface. Screws 19 are adjustable in flange 18 to vary the pitch of the plane of rotation of wheel 6 relative to measurement surface 7 so that the effective circumference of metering wheel 6, relative to its maximum circumference, may be selected for the reason set forth in U.S. Pat. No. 3,307,265. Bolts 20 are adjustable in flange 18 to vary the tilt of the measuring device about its longitudinal axis, thereby to adjust for undesired skew tracking of the metering wheel along the measurement surface.

Figure 3:
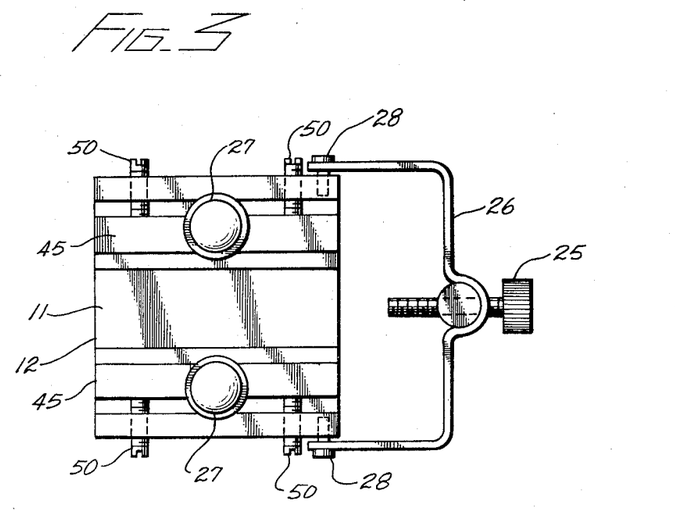
FIG. 3 is a view taken along line 3—3 in FIG. 1.

Thin metal flexure plates 21 join the adjacent ends of the first and second mounting blocks to couple the mounting blocks to each other for movement of the blocks relative to each other only along a line normal to the measurement surface, i.e., along a line parallel to the length of male dovetail member 10. The lower surface of the first mounting block and the upper surface of the second mounting block are configured to define a cavity 30 between them when the mounting blocks are secured to each other by plates 21. The upper and lower surfaces of the cavity are defined by opposing concave surfaces 22 formed in blocks 12 and 13; however, it should be realized by those skilled in the art that other surface configurations can be employed to form the cavity. Disposed within the cavity is an elongate sheet 23 of spring metal which has its opposite ends in abutting but not fixed contact with the lower end of the first mounting block adjacent measurement surface 7 and the upper end of the second mounting block remote from the surface. In other words, the resilient sheet is loaded as a column. The blocks are arranged so that a line between the ends of sheet 23 is more nearly parallel to the length of male dovetail 10 than perpendicular to the male dovetail. Windows 24 are provided through blocks 12 and 13 on either side of the resilient sheet to the cavity to allow a machinist or other user of the mounting assembly to view deflections in the resilient sheet. The rear end of male dovetail member 10 is engageable by abutment with screw knob 25 which is mounted in a substantially rigid non-resilient U-shaped yoke 26 (see FIG. 3), the ends of which are pivoted at 28 to the first mounting block opposite from measurement surface 7. FIG. 3 is a top view of the mounting assembly shown in FIGS. 1 and 2. Holes 27 are provided for passing bolts 15 through block 12 into block 13; when bolts 15 are secured, they do not engage the upper block and thus do not interfere with the movement of block 12 relative to block 13. Sheets 21 are relatively thin to provide a frictionless flexure coupling of very low stiffness between the mounting blocks; the stiffness of this coupling is substantially lower than the stiffness of spring sheet 23 with the result that the force of engagement of wheel 6 with measurement surface 7 is attributable exclusively to the effect of spring sheet 23.

Figure 4:
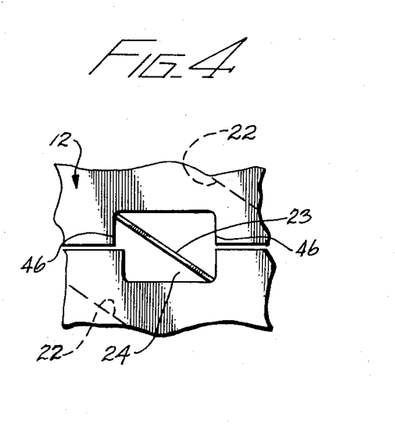
FIG. 4 is a view, through the aperture to the cavity in the mounting apparatus, of the resilient sheet in a non-deflected position.
Figure 5:
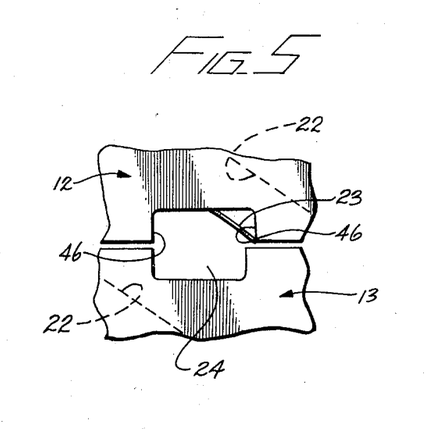
FIG. 5 is similar to FIG. 4, but shows the resilient sheet as deflected to produce a biasing force of desired value.

FIGS. 4 and 5 are fragmentary side views of the mounting assembly through window 24 to the resilient sheet 23 in cavity 30. FIG. 4 shows the resilient sheet in a non-deflected position, whereas FIG. 5 shows the resilient sheet in a deflected position. Thus, the machinist is able to preset the normal operating deflection of resilient sheet 23 by turning knob 25 after the measuring device and mounting mechanism have been assembled as shown in FIG. 1.

Figure 6:
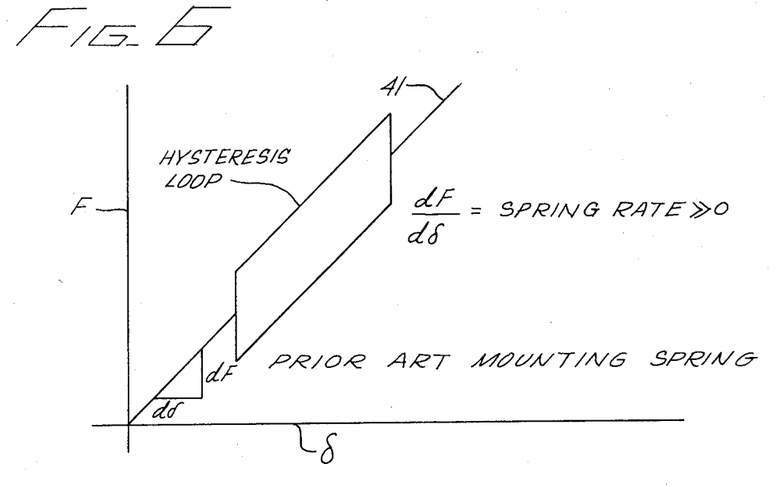
FIG. 6 is a graphical representation of the force/deflection characteristic of a spring as encountered in a typical prior art mounting structure.

As has been stated above, the problem to which this invention is addressed involves repeatability errors caused in part by non-reciprocal force variations transmitted from the measurement surface to the measuring device. The force variations occurred when the rotary wheel contacted imperfections in the measurement surface, thereby displacing the measuring device relative to the measurement surface to deflect the spring member used in the prior art mounting mechanisms. Since such prior art spring members had substantial stiffness and a spring rate of appreciable value, the deflection manifested itself as a variation in the force of engagement of the wheel with the measurement surface. Furthermore, since the prior art friction-wheel measuring devices were slidably secured with respect to the mounting base, substantial frictional hysteresis was manifest. The force/deflection curve 41 of a typical prior art biasing spring is shown in FIG. 6; such curve is linear and has substantial slope, thereby indicating that the spring has substantial stiffness. The spring rate of the spring represented by curve 41 is given by the slope of the curve.

Figure 7:
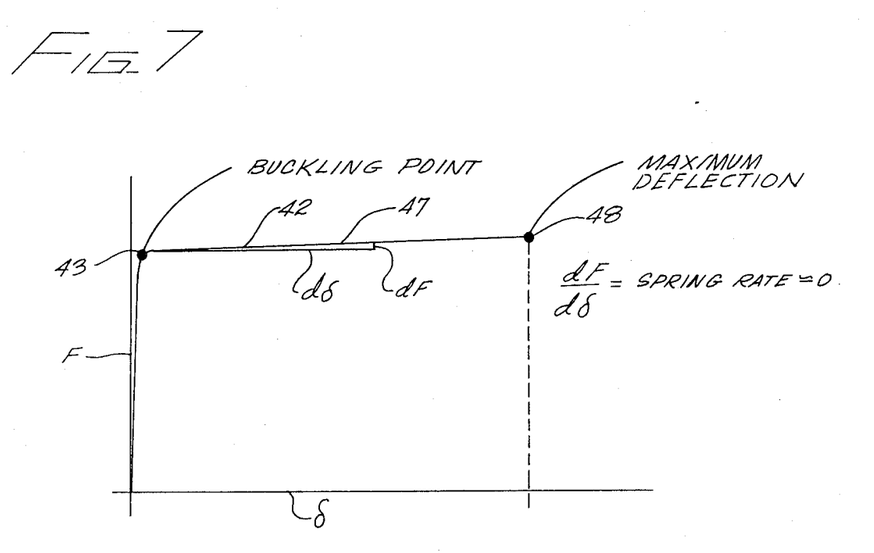
FIG. 7 is a graphical representation of the force/deflection characteristics of the resilient sheet in the mounting apparatus shown in FIG. 1.

Resilient sheet 23, used as a spring member in the mounting mechanism of the present invention, because of its mounting between blocks 12 and 13, has a force/deflection curve 42 generally as shown in FIG. 7 when deflected by movement of block 12 away from measurement surface 7 along the single line of movement afforded to block 12 by flexure plates 21; such movement is produced by operating knob 25 to drive male dovetail member 10 to the left relative to block 12 as seen in FIG. 1. During such movement, sheet 23 is loaded essentially as a column having a low degree of eccentricity in the application of the load to it (see, for example, *Elements of Strength of Materials*, by Timoshenko and Mac Cullough, one volume, D. Van Nostrand Company, Inc., New York, 3rd. Ed., 1949, pages 288 to 291). Since the resilient sheet is loaded as a column, practically no deflection results from the initial amounts of force transmitted thereto as knob 25 is operated. Eventually, however, the critical load for the column will be reached, at which point the column buckles and deflects toward one or the other of surfaces 22 defined by blocks 12 and 13. Thus, with reference to FIG. 7 and curve 42, the critical load for sheet 23, loaded as a column, is the load associated with knee 43 of curve 42. For loads less than the critical value, the column is far stiffer than prior art biasing springs. However, it has a very low, nearly zero, spring rate once sheet 23 has been loaded past its critical point and has buckled. Curve 42 shows that additional loads produce additional deflections of the sheet. In other words, if the sheet operates in a buckled condition during use of measuring device 1, movements of housing 5 toward or away from measurement surface 7 produce very small changes in the load applied to sheet 23 and the wheel tracking force (generated by sheet 23) is essentially constant.

Curve 42 is representative of the force/deflection curve for a column having a low degree of eccentricity of applied load. If the column load has a greater degree of eccentricity, the knee of curve 42 is more rounded and the curve to the right of the knee has somewhat greater slope; in this respect, reference is made to the above-cited text, page 290.

Sheet 23 has a length, thickness and width selected in combination with the eccentricity of load application to the sheet (i.e., in combination with the geometry of blocks 12 and 13) so that the critical load value of the sheet, loaded as a column, is slightly less than the value of wheel tracking force desired during use of measuring device 1. Where measuring device 1 is a "Trav-A-Dial" measuring device, the suggested tracking force value is in the range of from about 12 to about 40 pounds, and it is preferred that a tracking force on the order of about 40 pounds be used. It will be recognized, however, that more or less tracking force may be used as desired, depending upon the effective inertia of the wheel (i.e., the inertia of the wheel itself and the inertia of all elements driven by the wheel as reflected at the interface between the wheel and the measurement surface) and the vibrations and accelerations to which it is expected the wheel be subjected during use of the measuring device.

In operation, and with reference to FIG. 1, measuring device 1 is mounted on machine tool 2 by means of the mounting assembly 3 such that the rotary wheel 6 is engaged with measurement surface 7 and sheet 23 is unloaded. Initially, male dovetail 10 is relatively loosely engaged between gibs 45 defining the sides of female dovetail 11. Screw 25 is then moved into contact with the rear end of male dovetail member 10 and is turned in such manner as to tend to drive the male dovetail to the left. Wheel 6, however, is in contact with measurement surface 7 with the result that such operation of the screw pulls block 12 to the right along the male dovetail and relative to stationary block 13. The user continues to turn screw 25 while observing the state of deflection of sheet 23 through window 24. Initially, before sheet 23 begins to deflect, the sheet, as seen through window 24, extends diagonally of the window (see FIG. 4); the blocks are configured so such is the case. Once the sheet begins to buckle, the portion of the sheet visible through the window will begin to move toward one or the other two diagonal corners of the window as shown in FIG. 5. The user, once the sheet has begun to buckle, continues to operate screw 25 until the portion of the sheet visible through the window appears to intersect one of the lowermost limits of the window defined by block 12, i.e., corners 46 shown in FIGS. 4 and 5; at this point sheet 23 will be deflected to a state represented by point 47 on curve 42 (FIG. 7) approximately midway between knee 43 and the terminus 48 of the curve where the sheet engages one of surfaces 22. The sheet, at such point, functions as a spring of very low stiffness which is effective to produce the desired tracking force between wheel 6 and measurement surface 7. Once the sheet has been deflected to the desired point, gibs 45 are tightened against male dovetail 10 by operation of screws 50 (see FIGS. 2 and 3) to lock the male dovetail to block 12; in this manner the male dovetail is prevented from moving relative to block 12 should screw 25 work loose during use of the measuring device. Thus frictional hysteresis is substantially eliminated (compare FIG. 7 with FIG. 6). Thereafter, during use of the measuring device, the device may be moved toward and away from measurement surface without significantly altering the force with which wheel 6 engages the measurement surface.

Figure 8:
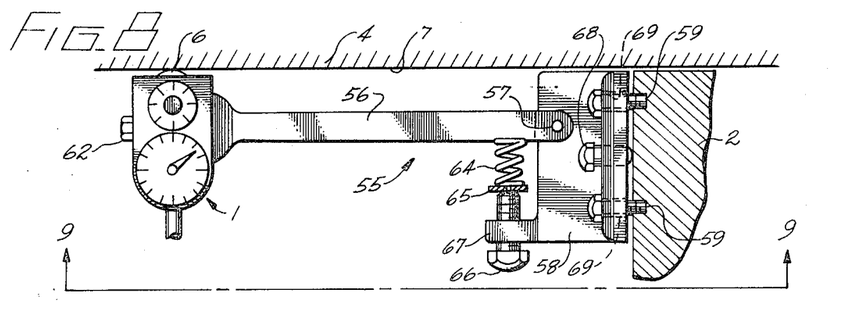
FIG. 8 is a top plan view of a friction-wheel measuring device mounted on a machine tool by another mounting apparatus according to this invention.
Figure 9:
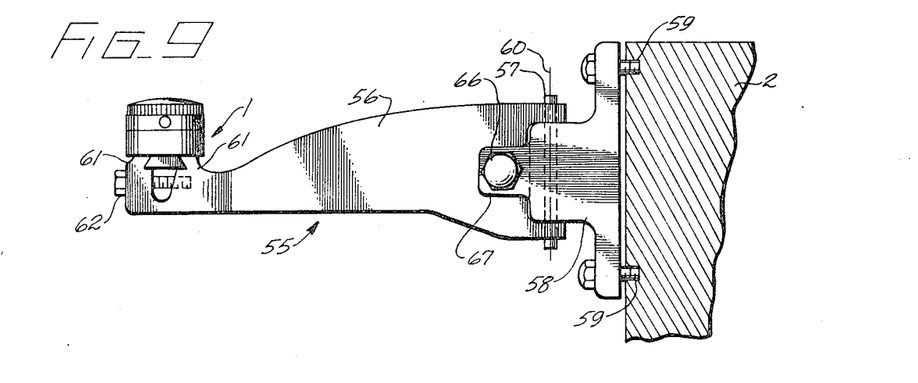
FIG. 9 is an elevation view taken along line 9—9 in FIG. 8.

Another mounting assembly 55 for measuring device 1 is shown in FIGS. 8 and 9. This mounting assembly includes a rigid lever arm 56 which is hinged by pin 57 to a mounting block 58. In use, block 58 is secured by bolts 59 to a lathe carriage 2, for example, so that the axis 60 of hinge pin 57 is disposed parallel to a measurement surface 7 defined by a lathe bed 4, for example, and is also perpendicular to the line of gross relative movement between the lathe bed and the lathe carriage.

Lever arm 56 extends in cantilever fashion from the mounting block to an unsupported end which carries measuring device 1. The measuring device is held within a pair of dovetail gibs 61 which are movable relative to each other by bolt 62 to securely clamp the measuring device to the free end of the lever arm so that the axis of rotation of metering wheel 6 is parallel to hinge pin axis 60. A tracking force bias spring 64 is engaged between lever arm 56 and mounting block 58 closely adjacent hinge pin 57. The spring is of the coil compression type and has one end engaged with the lever arm and the other end engaged with a back-up disk 65 carried by the end of a force adjustment bolt 66 threaded through a finger 67 which projects from the mounting block at the end of the block opposite from measurement surface 7. As will be apparent from an inspection of FIG. 8, adjustment of bolt 66 varies the bias force applied by spring 64 to lever arm 56 to urge metering wheel 6 into contact with measurement surface 7.

In order that the pitch and tilt of the metering wheel of the measuring device engaged in mounting assembly 55 may be adjusted relative to measurement surface 7 for the purposes described above, it is desired that mounting block 59 be secured to lathe carriage 2 by means of bolts 59, and also by means of bolts 68 and oversize holes 69 for bolts 59. Bolts 68, as shown in FIG. 8, bear against the lathe carriage but are not threaded into the carriage. Two bolts 68 are provided, one at each of the upper and lower extremities of the mounting block centrally of the adjacent ones of bolts 59 which are located at the four corners of the mounting block. Bolts 59 and 68 are adjustable, in the manner described above relative to bolts 20 and screws 19, to vary the tilt of the metering wheel relative to the direction of gross relative movement between the lathe carriage and the lathe bed. Because holes 69 through mounting block 58 for bolt 59 are oversize relative to the bolt shanks, the position of the mounting block on the lathe carriage may be adjusted to move hinge pin axis 60 out of parallelism to measurement surface 7 as desired to adjust the pitch of metering wheel 6 relative to the measurement surface.

Figure 10:
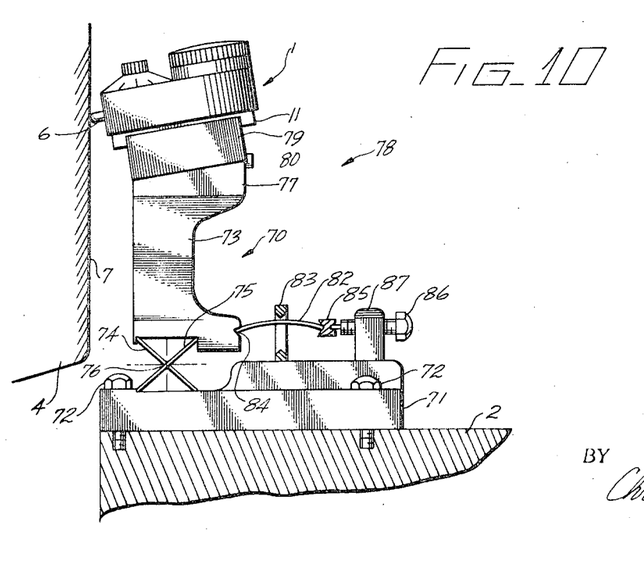
FIG. 10 is a side elevation view of a friction-wheel measuring device mounted on a machine tool by yet another mounting apparatus according to this invention.

It will be observed that the path of movement followed by the measuring device shown in FIGS. 8 and 9 is not wholly linear (as is the case with the mechanism shown in FIGS. 1–5), but rather is slightly curved about hinge pin 57. Because the axis about which measuring device moves is parallel to the metering wheel axis, the angularity of such movement, if kept small, has no effect upon the measurement accuracy of the measuring device or upon the repeatability error which may be associated with the particular application of the measuring device. Also, because bias spring 64 is located some distance from the measuring device in a mechanism which has substantial mechanical advantage, the stiffness of the spring may be very low and still be effective, as manifested at the metering wheel-measurement surface interface, to develop the desired tracking force. In the lever arrangement shown in FIGS. 8 and 9, the force of the spring per se is multiplied by the mechanical advantage of the arrangement, but the effect of spring stiffness (or spring rate) varies as the square of the leverage ratio (mechanical advantage). Therefore, in mounting assembly 55, spring 64 may be a soft coil spring without undue adverse effect upon the problem of variation of metering wheel tracking force. If desired, however, a column loaded leaf spring may be used in lieu of a coil spring in assembly 55 in the manner illustrated in FIG. 10. Also, if desired, hinge pins 57 may be replaced by a frictionless flexure pivot as shown in FIG. 10. Because of the compactness of mounting assembly 3, it is preferred over assembly 55 in those situations where the environment allows either system to be used.

FIG. 10 illustrates another mounting assembly 70 which includes a base member 71 secured directly and fixedly to lathe carriage 2, for example, by bolts 72. Assembly 70 also includes a vertical lever arm 73 pivotally mounted to the base member by a pair of perpendicularly crossed, thin metal flexure plates 74 and 75 which define a pivot axis 76 parallel to the plane of rotation of the metering wheel 6 of a measuring device 1 carried at the upper end of the lever arm. The upper terminal portion 77 of lever arm 73 defines one of the two principal components of a pitch and tilt adjustment mechanism 78 of the type shown in copending commonly-owned application Ser. No. 7523 filed Feb. 2, 1970. The other component 79 of the adjustment mechanism securely engages the male dovetail member 11 of measuring device 1. The pitch and tilt adjustment mechanism 78 provides a ball-type pivot between the components thereof and relies upon complementary adjustment of two cone-ended bolts 80 (which also function to secure the components together) to provide tilt adjustments and upon a jackscrew (not shown) engaged between the components to provide pitch adjustments.

Lever arm 73 is biased about pivot axis 76, in a direction urging wheel 6 into contact with the measurement surface, by a column loaded, leaf spring 82 engaged between the lever arm and base member 71 adjacent the pivot axis. Leaf spring 82 performs much like spring 23 described above and is effective along a line spaced from, close to, and normal to pivot axis 76. The leaf spring extends through a deflection limiting keeper ring 83 carried by the base member intermediate the ends of the spring which are engaged, respectively, in a notch 84 in the lever arm and a notched loading plug 85 rotatably mounted to the end of a force adjustment bolt 86 threaded through a lug 87 extended from the base member. Keeper ring 83 functions to limit buckling of spring 82.

It will be understood that the pitch and tilt adjustment mechanism shown in FIG. 1 could be incorporated in lever arm 73 if desired. Also, because the mechanism shown in FIG. 10 has a large leverage ratio, the soft coil spring shown in FIG. 8 could be used in place of leaf spring 82 without undue adverse effect upon the problem of variations in metering wheel tracking force.

As between mounting assemblies 3 and 70, assembly 3 is preferred because the arcuate path of movement of a measuring device engaged with assembly 70 is such that movement of the device along such path has a potentially adverse effect upon measurement accuracy. Because pivot axis 76 is essentially parallel to the metering wheel plane of rotation, pivoting of lever arm 73 about axis 76 may produce a change in the effective radius of the metering wheel sufficient in magnitude to impair measurement accuracy of the measuring device. The possibility for such measurement inaccuracies is minimized as much as possible by making the distance between axis 76 and metering wheel 6 as great as possible so that, throughout the small amount of lever arm motion encountered, the measuring device carried by the upper end of the lever arm moves along an essentially linear path toward and away from the measurement surface; in assembly 55, a long lever arm is also used to define an essentially linear path of movement for a measuring device engaged in such assembly.

Each of mounting assemblies 3, 55 and 70 described above constitutes a significant improvement, in terms of reduction or elimination of repeatability error, over the mounting assembly shown in U.S. Pat. No. 3,378,929 in which the principal problem, in the same terms, is "stiction" between male dovetail member 11 and the cooperating structure of the mounting assembly. The hinged support encountered in mounting assembly 55 is far less troublesome, and the frictionless flexure supports of assemblies 3 and 70 avoid the problem of stiction entirely. As noted above, mounting assembly 3 is preferred over assemblies 55 and 70; this structure is approximately 20 times better, in terms of repeatability, than the structure shown in U.S. Pat. No. 3,378,939.

From the foregoing, it is apparent that the mounting mechanisms of this invention eliminate or substantially reduce repeatability errors produced by variations in the tracking force of the metering wheel of a friction-wheel measuring device, factor 3 described above. This is so because the present mounting mechanisms do not allow the tracking force to change to any significant extent during use of the measuring device. Also, because the wheel tracking force is constant, the present mounting mechanisms, especially mounting assembly 3, have beneficial influences upon the first two causative factors of repeatability errors.

Thus, there have been described structurally simple, efficient and economic improved mounting mechanisms for friction-wheel measuring devices. The specific mechanisms described above are only several manifestations of even more structural arrangements within the scope of this invention. Therefore, it will be apparent to those skilled in the art to which this invention pertains that variations and modifications may be made to the described structures without departing from the scope of the invention.

What is claimed is:

1. A mounting mechanism for a friction-wheel measuring device comprising:
   first and second relatively movable members;
   means defined by the first member for coupling a friction-wheel measuring device to the first member in a predetermined relation;
   means mounting the second member to the first member for relative movement therebetween and configured and arranged so that during such relative movement a friction-wheel measuring device coupled to the first member moves along only a single substantially linear path essentially parallel to the plane of rotation of the friction wheel of the measuring device;
   means for securing the second member to a structure with which it is desired that a friction-wheel measuring device be used; and
   means for resiliently biasing the first member in a selected direction along said path relative to the second member with a selected force which, when manifested at the friction wheel of a measuring device coupled to the first member during use of such measuring device, is essentially constant throughout substantial movements of the first member relative to the second member along said path.

2. Apparatus according to claim 1 wherein the resiliently biasing means includes an elongate sheet of spring metal engaged between the first and second members for loading and deflection as a slender column by movement of the first member in the opposite direction along said path relative to the second member.

3. Apparatus according to claim 2 wherein a line between the opposite ends of the spring metal sheet is more nearly parallel to said path than normal to said path.

4. Apparatus according to claim 2 including means for indicating deflection of the sheet sufficient to produce the selected force.

5. Apparatus according to claim 4 wherein the spring metal sheet is disposed in a cavity defined between the first and second members.

6. Apparatus according to claim 5 wherein the cavity is essentially fully enclosed by the first and second members, and the deflection indicating means is comprised by the limits of an aperture through the members to the cavity adjacent the edge of the sheet intermediate the ends of the sheet.

7. Apparatus according to claim 1 wherein the means mounting the first and second members for relative movement is an essentially frictionless means.

8. Apparatus according to claim 1 wherein the means mounting the first and second members for relative movement comprises a pair of thin metal sheets each connected between the members and disposed perpendicular to said path.

9. Apparatus according to claim 1 including means coupled to the first member for cooperation with a measuring device coupled to the first member and operative for moving the first member in the opposite direction along said path to bias said selected force into the resilient means.

10. In a measuring installation in which a friction-wheel measuring device is mounted to one of two relatively movable members for engagement of the periphery of the friction wheel with a measurement surface defined by the other relatively movable member, the improvement comprising:
   means mounting the device to the one member and biasing the wheel into engagement with the measurement surface with constant force throughout movements of the device relative to the first member during use of the device, the mounting and biasing means including a first part engaged with the measuring device, a second part mounted to the one relatively movable member and relative to which the first part is movable along a path essentially normal to the measurement surface, and spring means engaged between the first and second parts for biasing the first part and the measuring device engaged therewith toward the measurement surface with a force of selected magnitude, the spring means at least when developing said force having a spring rate which is essentially zero.

11. Apparatus according to claim 10 wherein the spring means comprises an elongate sheet of spring metal disposed between the first and second parts to be end-loaded as a column, the parts and the sheet being cooperatively arranged so that end-loading of the sheet by the parts in use of the installation is with minimal eccentricity.

12. Apparatus for mounting a friction-wheel measuring device on a machine tool for measurement of the movement of the tool along a measurement surface, and for maintaining a constant force directed from the measurement surface to the measuring device in order to limit repeatability errors, comprising:

a first mounting block having upper and lower surfaces;

a second mounting block having upper and lower surfaces;

first means slidably engaging the upper surface of the first mounting block with the friction-wheel measuring device;

second means fixedly securing the lower surface of the second mounting block to the machine tool;

third means joining the first and second mounting blocks such that a cavity is defined between the lower surface of the first mounting block and the upper surface of the second mounting block;

a resilient sheet having ends and positioned in the cavity such that one end contacts the lower surface of the first mounting block and the other end contacts the upper surface of the second mounting block; and fourth means attached to the measuring device for providing its movement relative to and in frictional engagement with the measurement surface, the fourth means frictionally engaging the device with the surface with such a force, directed from the surface to the device and thus transmitted to the resilient sheet, as to cause it to buckle and deflect toward one of the blocks.

13. The apparatus of claim 12 in which the first means includes a male dovetail member fixedly secured to the friction-wheel measuring device; and in which the upper surface of the first mounting block includes a female dovetail groove, the male dovetail member being slidably positioned in such groove.

14. The apparatus of claim 13 in which the lower surface of the first mounting block and the upper surface of the second mounting block contain concave portions, each end of the resilient sheet being fixedly in contact with a respective concave portion such that the concave portions define the maximum deflection of the resilient sheet.

15. The apparatus of claim 14 in which the fourth means includes a screw engageable with an end of male dovetail member and mounted on a U-shaped member, the sides of which are fixedly secured to the first mounting block.

16. The apparatus of claim 15 further comprising a window mounted above the aperture defined between the first and second mounting blocks for allowing the viewing of the resilient sheet positioned in such aperture.

17. In a measuring installation which includes a motion sensing wheel adapted for frictional engagement of the periphery thereof with a surface along which measurements are to be made, and support means rotatably mounting the sensing wheel, an improved structure for biasing the wheel toward said surface comprising a support member, means mounting the support means to the support member for movement of the sensing wheel relative to the support member along a predetermined path toward and away from said surface, an elongate sheet of spring metal having one end thereof coupled to the support means and the other end thereof coupled to the support member, and means for compressively loading the spring metal sheet along the length thereof sufficiently to produce column buckling of the sheet, the spring metal sheet being disposed between the support means and the support member so that the reaction force developed by the sheet when buckled acts on the support means for moving the wheel along said path toward said surface.

18. Apparatus according to claim 17 wherein the means mounting the support means to the support member defines a hinge axis about which the support means is movable relative to the support member, and the sheet is coupled to the support means adjacent the hinge axis for action of the reaction force on the support means along a line substantially normal to and spaced from the hinge axis.

19. Apparatus according to claim 18 wherein the support means includes a lever arm connected to the support member via the hinge axis and rotatably carrying the wheel at a location thereon spaced from the hinge axis, and the spring metal sheet is coupled to the lever arm adjacent the hinge axis.

* * * * *